No. 642,659. Patented Feb. 6, 1900.
L. WUSSLER.
ANIMAL POKE.
(Application filed Dec. 11, 1899.)
(No Model.)

Witnesses:

Inventor
Louis Wussler.
By James J. Sheehy
Attorney

UNITED STATES PATENT OFFICE.

LOUIS WUSSLER, OF GOEHNER, NEBRASKA.

ANIMAL-POKE.

SPECIFICATION forming part of Letters Patent No. 642,659, dated February 6, 1900.

Application filed December 11, 1899. Serial No. 739,910. (No model.)

*To all whom it may concern:*

Be it known that I, LOUIS WUSSLER, a citizen of the United States, residing at Goehner, in the county of Seward and State of Nebraska, have invented new and useful Improvements in Animal-Pokes, of which the following is a specification.

My invention relates to animal-pokes; and it consists in the peculiar and advantageous construction hereinafter described, and particularly pointed out in the claims appended.

Figure 1:
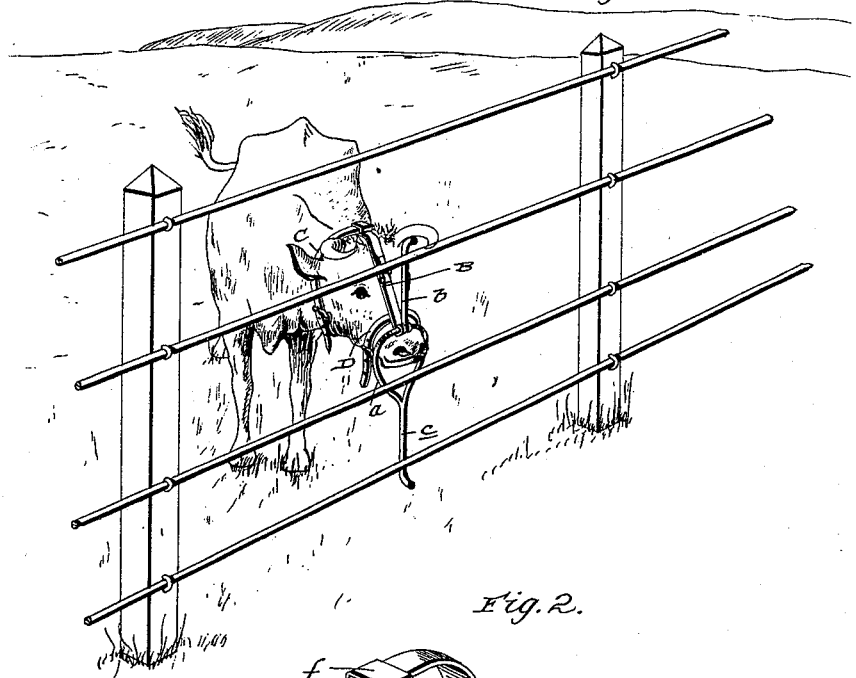
Figure 2:
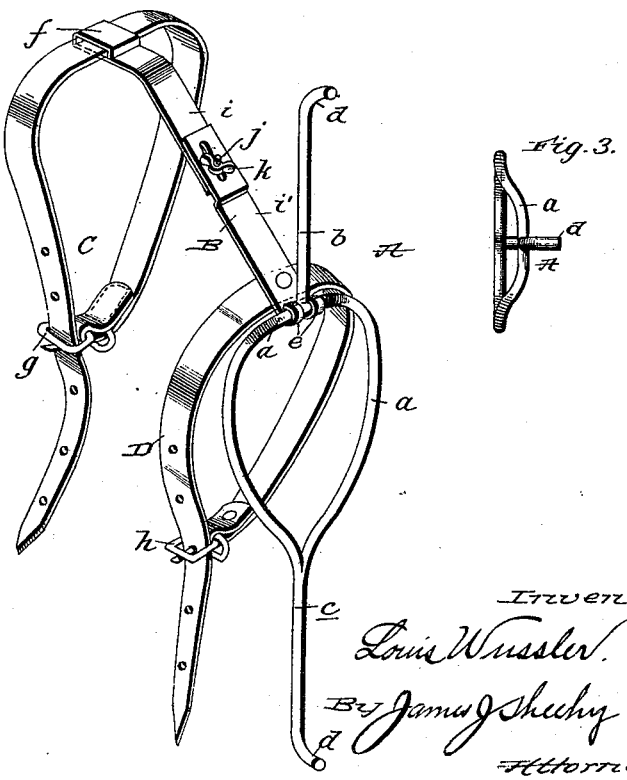
Figure 3:
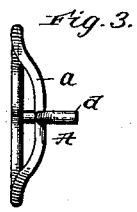

In the accompanying drawings, Figure 1 is a view illustrating the manner in which my improved poke operates to prevent a cow or other animal putting its head between the runners of a wire fence. Fig. 2 is an enlarged perspective view of the poke removed. Fig. 3 is a top plan view of the poke-body.

Referring by letter to the said drawings, A is the body of my improved poke. This body is preferably made of iron and comprises the central open portion $a$, of a size to loosely receive the muzzle of the animal, and arms $b$ and $c$, reaching upwardly and downwardly from said central portion and terminating in forwardly-directed angular branches $d$ for a purpose presently pointed out.

B is a metallic strap which is designed to rest over the forehead of the animal after the manner shown in Fig. 1. This strap is provided at its forward end with eyes $e$, which loosely surround the central portion $a$ of the body A at opposite sides of the arm $b$, and hence it will be seen that the said body is free to swing on the strap. It will also be seen that the major portion of the body is below the pivotal connection of the same to the strap, and consequently the said body when free will always assume an upright position.

C is a strap, of leather or other suitable material, passed through an eye $f$ at the upper end of the strap B and designed to be fastened by a buckle $g$ around the neck of the animal, and D is a retaining-loop adapted to loosely surround the jaws of the animal, and thereby hold the strap B against undue movement away from the animal's head without interfering with the animal-grazing. This retaining-loop is preferably in the form of a leather strap, which is riveted or otherwise connected to the strap B adjacent to the forward end thereof and is provided with a buckle $h$, whereby it may be fastened on the animal. The strap B is preferably made up of two sections $i\ i'$, adjustably connected by a bolt $j$ and thumb-nut $k$, as shown, in order that it may be readily lengthened or shortened to fit the heads of animals of different sizes.

The poke is applied to an animal in the manner shown and described, and when the animal lifts its head, so as to raise the body A clear of the ground, the said body A assumes a perpendicular position. From this it follows that in the event of the animal attempting to put its head between the runners of a wire fence the arms $b$ and $c$, as well as the central portion $a$ of the body A, will engage runners of the fence and effectually prevent such operation. If the animal attempts to raise or lower the body in order to push one end of the same between runners of the fence, one or the other of the branches $d$ will engage a fence-runner and prevent upward or downward movement of the body. When the animal puts its head to the ground to graze, the arm $c$ bears on the ground in rear of the animal's head and prevents the poke from interfering with the animal feeding in comfort.

The central portion $a$ of the body is curved backward from the arm $b$, as best shown in Fig. 3, to prevent said open portion $a$ from swinging off the muzzle of the animal.

It will be appreciated from the foregoing that while highly efficient in operation my improved poke is simple and light in construction and is susceptible of being readily fastened on and removed from the head of a cow or other animal.

Having thus described my invention, what I claim is—

1. An animal-poke comprising a strap adapted to rest on the forehead of an animal, means for fastening said strap in position on the head of the animal, and a body comprising a central open portion of a size to loosely receive the muzzle of the animal, and arms extending upwardly and downwardly from said central portion; the said body being loosely connected to the strap at the juncture of the central open portion and the upwardly-extending arm, substantially as specified.

2. An animal-poke comprising a stiff strap adapted to rest on the forehead of an animal, a fastening-strap connected to the upper end of said stiff strap and adapted to be secured around the neck of the animal, a retaining-loop connected to the stiff strap and adapted to surround the jaws of the animal, and a body comprising a central open portion of a size to loosely receive the muzzle of the animal, and arms extending upwardly and downwardly from said central portion; the said body being pivotally connected to the strap at the juncture of the central open portion and the upwardly-extending arm, substantially as specified.

3. An animal-poke comprising an extensible strap adapted to rest on the forehead of the animal, and a body comprising a central open portion of a size to loosely receive the muzzle of the animal, and arms extending upwardly and downwardly from said central portion; the said body being loosely connected to the extensible strap at the juncture of the central open portion and the upwardly-extending arm, substantially as specified.

4. An animal-poke comprising a strap adapted to rest on the forehead of an animal, means for fastening said strap in position on the head of the animal, and a body comprising a central open portion of a size to loosely receive the muzzle of the animal, and arms extending upwardly and downwardly from said central portion; the said body being loosely connected to the strap at the juncture of the central open portion and the upwardly-extending arm, and being carried rearwardly from said upwardly-extending arm, substantially as specified.

In testimony whereof I have hereunto set my hand in presence of two subscribing witnesses.

LOUIS WUSSLER.

Witnesses:
   BENJAMIN F. NORVAL,
   RICHARD S. NORVAL.